United States Patent Office 3,346,589
Patented Oct. 10, 1967

3,346,589
NF₂ ADDUCTS OF UNSATURATED HYDROCARBYL AMINE, HYDRAZINE, OR AMMONIUM PERCHLORATES AND METHOD OF PREPARATION
Michael H. Gianni, Roselle, and Charles M. Orlando, Union City, N.J., assignors to Esso Research and Engineering Company, a corporation of Delaware
No Drawing. Filed May 29, 1964, Ser. No. 371,890
7 Claims. (Cl. 260—326.85)

This invention relates to a novel kind of solid rocket propellant oxidizer that contains energetic NF₂ oxidizing groups attached to carbon atoms and energetic perchlorate, HClO₄, groups in the same molecule as typified by the salt having the formula:

$$CH_2(NF_2)CH(NF_2)CH_2NH_2 \cdot HClO_4$$

which is the bis(NF₂)adduct of allylamine perchlorate and by similar compounds.

This invention provides a novel method of achieving the synthesis of the dual type oxidizers, i.e., those containing both NF₂ and HClO₄ oxidizing functions. The discovery that adducts of the tetrafluorohydrazine reactant, N₂F₄, with allylamine perchlorate could be made to take place smoothly to nearly quantitative yields was surprising because amine compounds were regarded as incompatible with difluoramino compounds hitherto.

There are certain advantages for preparing the compounds by the N₂F₄ addition reaction. N₂F₄ is easily made and commercially available.

The addition of N₂F₄ to the double bonds of allylamine perchlorate, $CH_2$=$CH$—$CH_2$—$NH_2 \cdot HClO_4$, may be carried out in a suitable diluent or solvent such as acetic acid or acetonitrile. The reaction proceeded smoothly to yield a tan solid in yields as high as 95% and higher. The adduct product of reasonably high purity has been isolated so that it could be analyzed and tested.

The addition of N₂F₄ to unsaturated aliphatic hydrocarbon radicals having amine, hydrazine or ammonium groups has been shown to take place in the same manner as described with reference to the following example.

*Example 1.—Preparation of bis(NF₂)adduct of allylamine perchlorate*

A solution of 0.413 gram (0.00263 mole) of allylamine perchlorate and 0.866 gram (0.0083 mole) of N₂F₄ in 3 ml. of glacial acetic acid and was heated in a 15 ml. Fisher-Porter pressure reactor for 24 hours. The consumption of N₂F₄ was quantitative. The bomb was evacuated and the acetic acid evaporated. There remained behind a yellowish solid (94% yield) which was purified by chromatography on silica gel using 20% acetonitrile in chloroform as the eluent. The pure product melts at 98° to 100° C. without decomposition. The composition of the adduct was calculated for C₃H₈N₃F₄ClO₄.

Found: C, 13.44; N, 16.01; F, 29.1; Cl, 13.5. Theory: C, 13.76; N, 16.09; F, 29.0; Cl, 13.5.

The shock sensitivity of the pure adduct was indicated to be about 25 kg. cm. This reasonable sensitivity suggests good handling characteristics.

The thermal stability of the adduct was found reasonable in showing a major DTA exotherm of 153° C., which is the temperature at which the substance can be heated without decomposition or explosion. The decomposition gases which were formed after long heating in a stability test indicated that the gases may come from an impurity so that purification would make the adduct more stable.

Evaluation of the adduct as an oxidizer in a solid rocket propellant composite show that it can be used to give the propellant reasonably high impulse values as illustrated by the following examples.

Using 48 wt. percent of the bis(NF₂)adduct of allylamine perchlorate with 2 wt. percent of boron powder as fuel, 10 wt. percent of ammonium perchlorate and 20 wt. percent of hexakis(NF₂)propyl ether mixed in a binder of 20 wt. percent of tetrakis(NF₂)amyl acrylate having the formula C₈H₁₀O₂(NF₂)₄ as the recurring unit, containing 60% NF₂, the Isp obtained is 275.9. Variations of the oxidizer and fuel ingredients with the same binder give Isp values in the range of 273 to 275.9, even with the ammonia perchlorate eliminated and replaced by bis(NF₂)allylamine perchlorate.

*Example 2.—Preparation of bis(NF₂)adduct of allyl hydrazine diperchlorate*

The salt $CH_2(NF_2)CH(NF_2)CH_2NHNH_2 \cdot 2HClO_4$, termed bis(NF₂)adduct of allyl hydrazine diperchlorate, is made by the addition reaction of N₂F₄ to allyl hydrazine diperchlorate using the method described in Example 1 with the following conditions:

Using 3.56 mmoles of the reactant $$CH_2=CHCH_2NHNH_2 \cdot 2HClO_4$$

in 3 ml. of CH₃COOH as solvent, 10 mmoles of N₂F₄ are admixed and the temperature is held in the range of 20° to 65° C. to accomplish absorption of the N₂F₄ by the salt in a period of 4 to 16 hours. Analysis showed that the solid product contained both primary and secondary NF₂ groups. The desired bis(NF₂)adduct obtained has the composition:

$$CH_2(NF_2)CH(NF_2)CH_2NHNH_2 \cdot 2HClO_4$$

The preparation of this diperchlorate adduct requires more care to prevent decomposition in order to obtain mainly the desired adduct product. The bis(NF₂)adduct of allyl hydrazine diperchlorate salt has been found capable of permitting the formation of solid rocket propellants having high Isp values. For instance, in using the same kind of binder, tetrakis(NF₂)amyl acrylate polymer in a proportion of 23 wt. percent, 23 wt. percent of hexakis(NF₂)propyl ether, 51.5 wt. percent of the bis(NF₂)-adduct of allyl hydrazine diperchlorate and 2.5 wt. percent of boron powder as fuel, the Isp determined for this composition is 282. Making variations in the composition by substituting for part of the bis(NF₂)adduct of allyl hydrazine diperchlorate other oxidizers, the Isp values go up to as high as 288, the proportion of the bis(NF₂)adduct of allyl hydrazine diperchlorate being varied from 11 wt. percent to 37 wt. percent in these compositions.

The success in carrying out the addition of N₂F₄ as NF₂ free radicals to double bonds of unsaturated hydrocarbon radicals linked to nitrogen in an amine (NF₂) and hydrazine (NH₂)₂ groups with an attached acid, e.g., HClO₄, to form a salt has been found to be general in nature. Accordingly, other N₂F₄ adducts may be formed such as the tetrakis(NF₂)adduct of pentadienyl amine perchlorate having the formula.

$$CH_2(NF_2)CH(NF_2)CH(NF_2)CH(NF_2)CH_2NH_2 \cdot HClO_4$$

and the adduct of 1,1-diallyl hydrazine diperchlorate having the formula:

$$[CH_2(NF_2)CH(NF_2)CH_2]_2NH \cdot 2HClO_4$$

All of such adducts contain NF₂ and HClO₄ energy groups which make them useful as oxidizers in rocket propellant of high thrust value.

In making the adducts of the more complex compounds, such as the adducts of tetraalkenyl ammonium perchlorate, a cyclization occurs which prevents addition of one mole of N₂F₄ to each alkenyl radical.

The reaction of 1.1 mmoles of tetraallyl ammonium perchlorate with 10 mmoles of N₂F₄ in 3 ml. of acetonitrile at temperatures in the range of 20° to 75° C. affords a product which is assigned the structure:

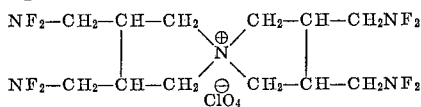

This bicyclic compound has a lower oxidizing potentiality but is nevertheless of interest on account of its stability and is thus useful in a propellant composition if lower impulse is to be obtained.

The composition may be set forth in condensed form as follows:

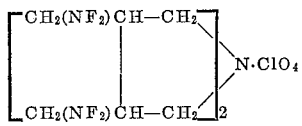

The invention described is claimed as follows:

1. $NF_2$ adduct of an unsaturated hydrocarbon radical linked to nitrogen in a function of the group consisting of amine, hydrazine and ammonium which is combined in a salt with perchloric acid.

2. Allylamine perchlorate ($NF_2$) adduct having the composition: $CH(NF_2)CH(NF_2)CH_2NH_2 \cdot HClO_4$.

3. Diallylamine perchlorate ($NF_2$) adduct having the composition: $[CH_2(NF_2)CH(NF_2)CH_2]_2NH \cdot 2HClO_4$.

4. Allyl hydrazine diperchlorate ($NF_2$) adduct having the composition:

$$CH_2(NF_2)CH(NF_2)CH_2NHNH_2 \cdot 2HClO_4$$

5. Tetraalkyl ammonium perchlorate ($NF_2$) adduct having the composition:

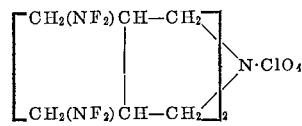

6. Pentadienyl amine perchlorate ($NF_2$) adduct having the composition:

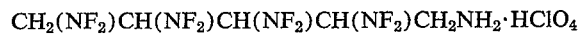

7. Method of preparing $NF_2$ adducts of perchlorate salts of compounds that contain an unsaturated hydrocarbon radical linked to nitrogen in a function selected from the group consisting of amine, hydrazine, and ammonium, which comprises reacting the salt with $N_2F_4$ under mild reaction conditions to form $NF_2$ adducts of the salt and recovering the adducts.

References Cited

UNITED STATES PATENTS 3,215,709  11/1965  Logothetis.

CHARLES B. PARKER, *Primary Examiner.*

CARL D. QUARFORTH, *Examiner.*

R. L. RAYMOND, L. A. SEBASTIAN,
*Assistant Examiners.*